United States Patent [19]

Mogamiya

[11] Patent Number: 5,446,512
[45] Date of Patent: Aug. 29, 1995

[54] CAMERA SYSTEM HAVING REMOTE CONTROLLER

[75] Inventor: Makoto Mogamiya, Tokyo, Japan

[73] Assignee: Asahi Kogaku Kogyo Kabushiki Kaisha, Tokyo, Japan

[21] Appl. No.: 169,070

[22] Filed: Dec. 20, 1993

[30] Foreign Application Priority Data

Dec. 18, 1992 [JP] Japan .................. 4-086951 U
Dec. 18, 1992 [JP] Japan .................. 4-086952 U

[51] Int. Cl.6 .............................................. G03B 15/03
[52] U.S. Cl. .................. 354/131; 354/266; 354/288
[58] Field of Search ............ 354/131, 132, 141, 145.1, 354/149.11, 266, 288

[56] References Cited

U.S. PATENT DOCUMENTS

| | | | |
|---|---|---|---|
| 4,091,398 | 5/1978 | Iida et al. | 354/145.1 |
| 4,290,685 | 9/1981 | Ban | 354/266 |
| 5,255,038 | 10/1993 | Suzuka | 354/266 |
| 5,305,041 | 4/1994 | Ichikawa et al. | 354/266 |

Primary Examiner—Howard B. Blankenship
Attorney, Agent, or Firm—Sandler, Greenblum & Bernstein

[57] ABSTRACT

A camera system according to the present invention is provided with a camera body for photographing an object, a remote controller for remotely controlling the camera body to execute a photographing operation, and a strobe which is provided on the remote controller for emitting light towards the object to be photographed.

24 Claims, 9 Drawing Sheets

5,446,512

CAMERA SYSTEM HAVING REMOTE CONTROLLER

FIELD OF THE INVENTION

The present invention relates to a camera system having a remote controller.

BACKGROUND OF THE INVENTION

In a camera having a strobe, if the strobe is provided near the photographing lens of the camera, i.e., if the optical axes of the strobe and the photographing lens are close to each other, a red-eye phenomenon will occur when photographing people. This red-eye phenomenon occurs because, before the flash is discharged, the ambient light is low and thus the pupil of the eye is dilated. When the flash is discharged, the pupil cannot constrict quickly enough, since the discharge time is very short. Consequently, light from the flash enters the pupil, is incident on the retina (having a red color as a result of the blood in the capillaries), and is reflected back towards the strobe. Since the pupil has not constricted enough, the reflected red light will be transmitted back to the camera and recorded on the film. The result is that the eyes of the person who was photographed appear to have large red pupils.

If the strobe is located far enough away from the photographing lens, the red-eye phenomenon can be avoided or sufficiently reduced. However, since it is convenient to provide a strobe on a camera, it is difficult to prevent the red-eye phenomenon.

Further, since the strobe is provided on the camera in a fixed position, it is impossible to vary the angle of the light emitted by the flash unit on the subject to be photographed. Therefore the mood of the photograph cannot be changed, since the shadows must always remain in a fixed position relative to the camera.

Furthermore, if the object is far away from the camera, the strobe cannot cast enough light on the object to obtain a properly exposed photograph.

SUMMARY OF THE INVENTION

It is therefore an object of the invention to provided an improved camera system which is capable of preventing the red-eye phenomenon, casting light on the object from various positions, and providing a sufficient amount of light to the object even if the camera is relatively far from the object.

For the above object, according to one aspect of the present invention, there is provided a camera system comprising a camera body, a remote controller for remotely controlling the camera body to execute a photographing operation, and a strobe provided on the remote controller, capable of being discharged to emit light when photographing is executed.

Specifically, the remote controller comprises a releasing device for initiating the photographing operation, and a mechanism for transmitting data relating to the photographing operation when the releasing device is operated. The camera body comprises a data receiving device for receiving the data outputted by the data transmitting mechanism, and a controller for controlling the camera to execute the photographing operation a predetermined period of time after the reception of the data by the data receiving device.

Optionally, the remote controller can be detachably attached to the camera body. Further, the transmitting mechanism and the data receiving device comprise communication members by way of which the data is transmitted only when the remote controller is attached to the camera body.

Alternatively, the transmitting mechanism comprises a light emitting device for transmitting a light beam modulated by the data, and wherein the data receiving device further comprises a light receiving device for receiving the light beam emitted by said light emitting device.

According to another aspect of the invention, there is provided a remote controller for a camera, including a releasing device for initiating a photographing operation of the camera, a transmitting mechanism for transmitting data, related to a release operation of the releasing device, to the camera to execute the photographing operation with the camera, a strobe device for emitting light towards an object to be photographed, and a controlling mechanism for controlling the strobe to be discharged when the releasing device is operated.

DESCRIPTION OF THE ACCOMPANYING DRAWINGS

DESCRIPTION OF THE EMBODIMENTS

Figure 1:
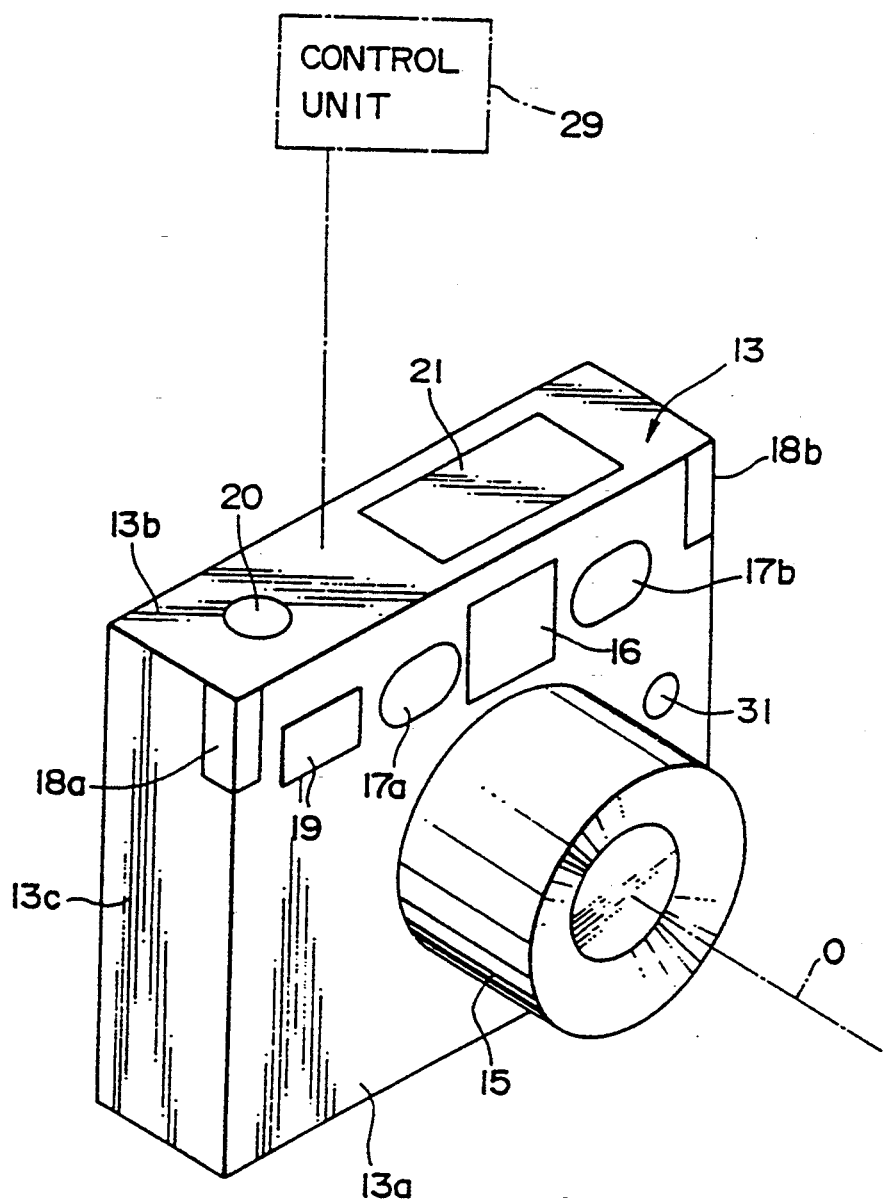
FIG. 1 is a perspective view of a camera controlled by a remote controller.
Figure 2:
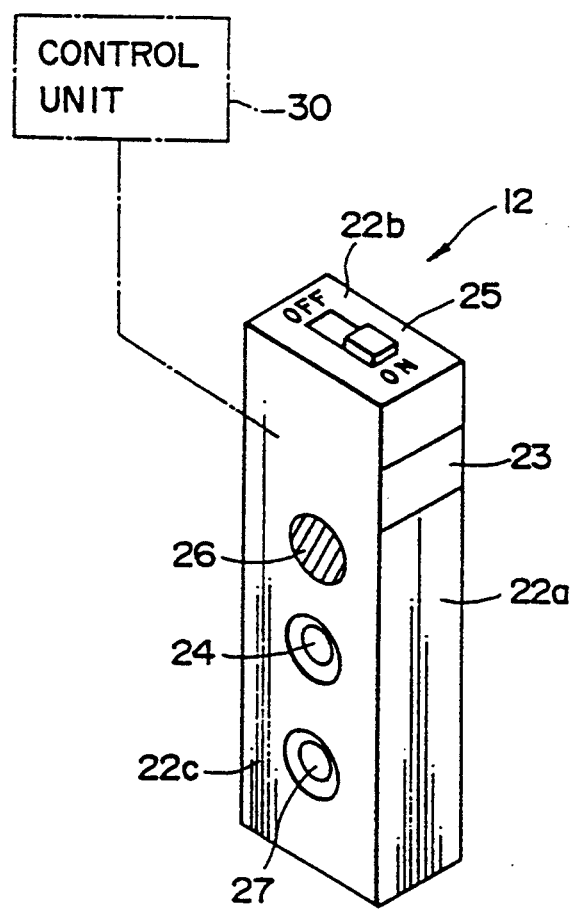
FIG. 2 is a perspective view of the remote controller embodying the present invention.

FIG. 1 shows a camera 13 to be controlled by a remote controller 12 shown in FIG. 2.

On the front surface of the camera 13, a photographing lens 15, and an infrared light emitter 31 used for measuring distance is provided. The optical axis of the light emitted from the infrared light emitter 31 is substantially parallel to the optical axis "0" of the photographing lens 15. A finder 16 is provided above the photographing lens 15, and a pair of light receivers 17a and 17b are provided on either side of the finder 16. The light receivers 17a and 17b receive infrared light reflected by an object after the object receives infrared light from emitter 31. A strobe 19 is provided next to the light receiver 17a.

A pair of light receiving devices 18a and 18b for receiving a control signal (infrared light carrying a control information) outputted from the remote controller 12 are provided on the front surface 13a of the camera at the upper portions thereof. On the top surface 13b of the camera 13, a release button 20 and a liquid crystal display 21 are provided. A control unit 29 having a microprocessor is accommodated in the camera 13.

The light receiving surfaces of the light receiving devices 18a and 18b extend from the front surface 13a to the side surfaces 13c (which is located in a plane extending transverse to the plane of front surface 13a, as illustrated in FIG. 1) in order to receive light emitted by the remote controller 12 from various positions.

The control unit 29 has a light emission controller and a shutter driver (not shown). The camera 13 has two operation modes: a normal mode (non-remote-control mode); and a remote-control mode. The normal mode and the remote control mode are switched by a control mode select switch (not shown) provided on the camera 13. If the camera 13 is operated in the normal mode, the control unit 29 controls the operation of the camera 13 independently of the control signals from of the remote controller 12. If the camera 13 is operated in the remote-control mode, the control unit 29 controls the camera 13 in accordance with the control information carried by the control signal, which is received by at least one of the light receiving devices 18a and 18b.

FIG. 2 shows the remote controller 12. The remote controller 12 includes a housing structure that is substantially rectangular in shape. On a front surface of the housing 22a, a strobe 23 Is provided, and a strobe switch 25 for turning ON or OFF a power supply to the strobe 23. On a side surface of the housing 22c, a light emitting unit 26 is provided. The light emitting unit 26 emits an infrared light carrying information relating to a release operation.

A release button 27, and a select switch 24 are provided on a front surface of the remote controller 12. A control unit 30 having a microprocessor is accommodated inside the remote Controller 12.

By depressing the remote controller select switch 24, a photographer can switch a flashing mode between a normal flashing mode and a pro-flashing mode. If the camera 13 operates in the remote control mode and the remote controller 12 operates in the normal flashing mode, upon depression of the remote controller release button 27, a photographing operation is performed with the discharging (i.e., light emission) of the remote controller strobe 23. If the remote controller 12 operates in the pre-flashing mode, only the remote controller strobe 23 flashes when the remote controller release button 27 is depressed, and predetermined period of time later, the photographing operation is performed with the discharging of the strobe 19, thereby the red-eye phenomenon can be repressed without consuming the charged electricity of the strobe 19.

The camera 13, controlled by the remote controller 12, is substantially the same as the conventional remote-controlled camera. Regardless of whether the operation mode is the normal mode or the remote control mode, the camera is operable in any one of:

(1) an automatic flashing mode;
(2) a forced flashing mode;
(3) a flash inhibited mode; and
(4) a macro mode.

The automatic flashing mode is the default mode. In the camera 13, charging of the strobe 19 is started when the power switch of the camera 13 is turned ON. Further, in the camera 13, when the release button 20 is depressed halfway, a distance measurement and a photometry operation is initiated, thus the object distance and the brightness of the object is metered. According to the metered brightness, the control unit 29 determines whether the strobe 19 should be discharged (flashed) or not when photographing. Upon full depression of the release button 20, the photographing operation is executed. If it has been determined that the strobe should be discharged, the strobe 19 is discharged synchronously with the photographing operation (i.e., with the shutter release).

If the operation mode is the remote control mode and the remote controller strobe switch 25 is OFF, the camera 13 executes the photographing operation in response to the depression of the remote controller release button 27.

If the operation mode is the remote control mode and the remote controller strobe switch 25 is ON, the remote controller control unit 30 starts light emitting procedures for the remote controller strobe 23, and transmits the information related to the release operation to the camera 13. In response to the transmitter signal, the camera control unit 29 controls the camera 13 to execute photographing operation a predetermined period after the reception of the information related to the release operation from the remote controller 12. The remote controller control unit 30 controls the remote controller strobe 23 to flash after a predetermined period after the remote controller release button 27 was depressed so that the remote controller strobe 23 flashes synchronously with the photographing operation.

The forced flashing mode is a mode in which the camera strobe 19 always flashes when photographing is executed. In this mode, if the operation mode is the remote control mode, the photographing is executed with the synchronous discharge (i.e., the light emission) of the camera strobe 19, and with the strobe 23 (if the strobe switch 25 is ON), similar to the remote controller case when the remote controller automatic flash mode is selected and the camera strobe 19 is to be flashed.

The flash inhibited mode is a mode in which light emission of the camera strobe 19 is inhibited. In this mode, if the camera 13 is controlled by the remote controller 12, only the remote controller strobe 23 flashes synchronously with the photographing operation caused by the depression of the remote controller release switch 27 when the remote controller strobe switch 25 is ON.

When the macro mode is selected, the light emission of the camera strobe 19 is inhibited as is the case where the flash inhibited mode is selected. Similar to the operation in the flash inhibited mode, only when the remote control mode is selected and the remote controller strobe switch 25 is ON, the photographing is executed with the synchronous light emission of the remote controller strobe 23 in response to the depression of the remote controller release button 27.

Figure 4A:
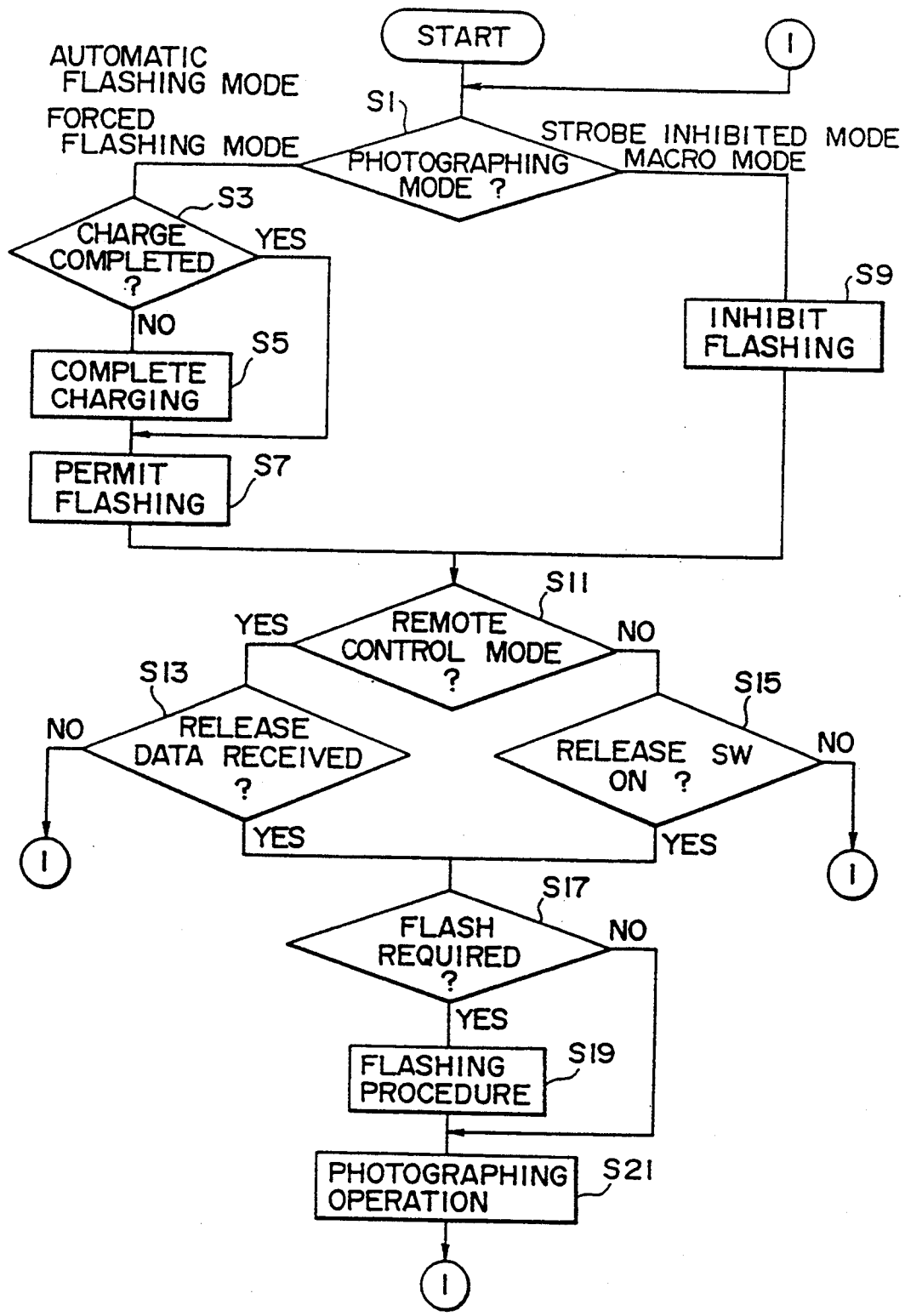
FIG. 4A is a flowchart illustrating an operation of the camera.

FIGS. 4A is a flowchart illustrating a flash and release control executed by the camera control unit 29.

When the photographing mode is in the automatic flashing mode or the forced flashing mode, which requires or allows the camera strobe 19 to discharge (i.e., to emit light), control goes from S1 to S3. The camera strobe 19 is completely charged in steps S3 and S5, then light emission of the strobe 19 is permitted in step S7. If the photographing mode is in the flash inhibited mode or the macro mode, which inhibit the camera strobe flashing, the light emission of the camera strobe 19 is inhibited in step S9.

If the operation mode is the normal mode (i.e., non-remote-control mode), control goes to steps S1 through S15 until the camera release button 20 is depressed. If the operation mode is the remote control mode, control goes to steps S1 through S13 until the remote controller release button 27 is depressed.

If the release button 20 is depressed in the normal mode, or release button 27 is depressed in the remote control mode, control goes to S17 and the photographing mode is examined in terms of the camera strobe 19 flashing. If the selected photographing mode uses the strobe 19 (i.e., the automatic flashing mode or the forced flashing mode is selected), the light emission procedure for the strobe 19 is initiated In step S19. Synchronously with the camera shutter release in step S21, the strobe 19 is controlled to emit light. After the camera shutter release in step S21, the control goes to step S1. If the selected mode does not require the discharging of the strobe 19, control goes to step S21 and the shutter release is executed without the camera discharge (light emission) of the strobe 19. Note that if the remote controller strobe 23 is discharged in this mode, the photographing is executed with the light emission of the remote controller strobe 23 in the manner described below.

Figure 4B:
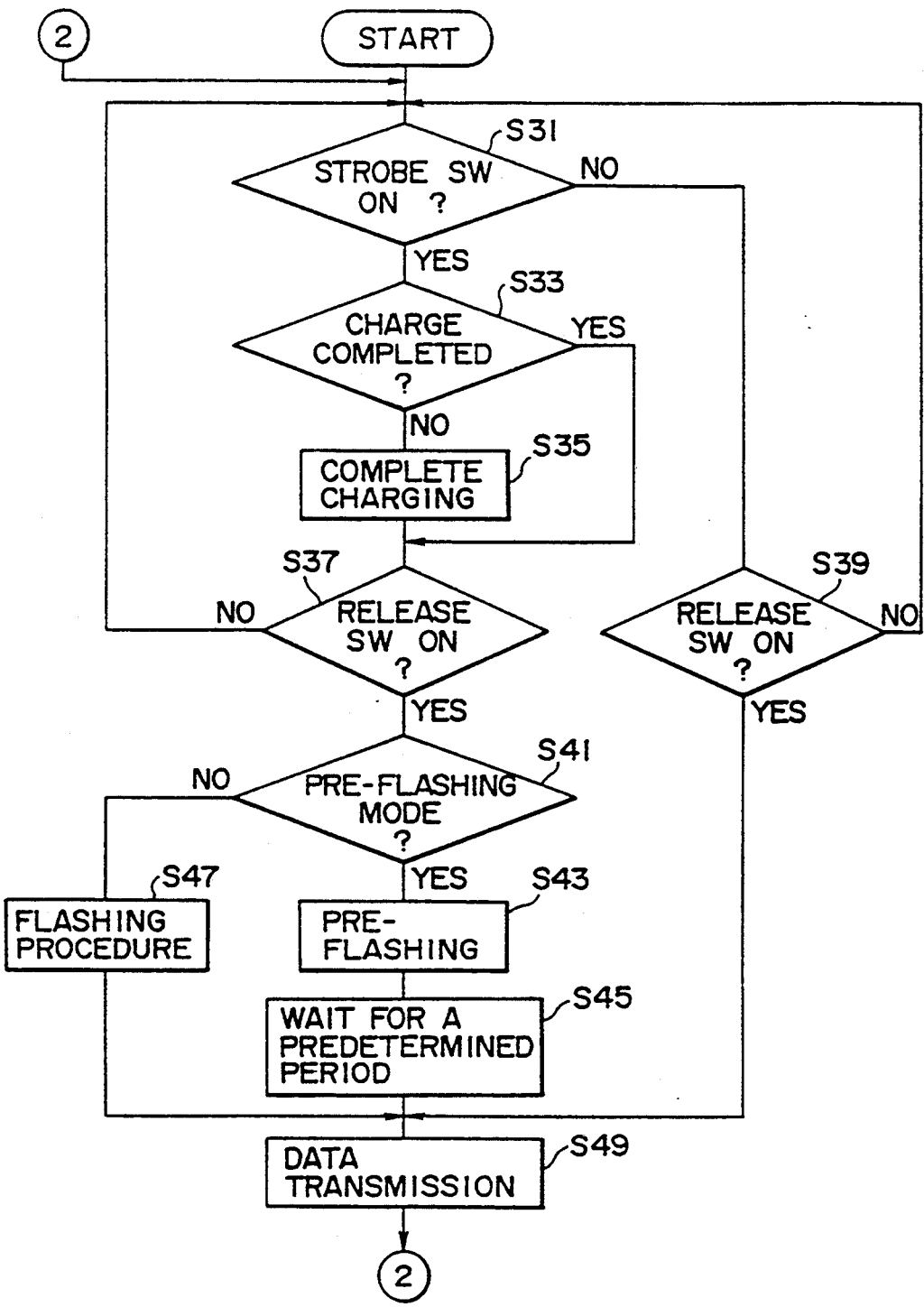
FIG. 4B is a flowchart illustrating an operation of the remote controller.

FIG. 4B is a flowchart illustrating a control executed by the control unit 30. The remote control mode has three following control modes:

(a) no remote controller strobe discharging;

(b) remote controller strobe discharging only when a picture is being taken; and (c) remote controller strobe discharging before a picture is taken.

In case (a), the remote controller strobe switch 25 should be turned OFF. On the other hand, in cases (b) and (c), the remote controller strobe switch 25 should be turned ON so that the remote controller strobe 23 is charged.

If the control mode (a) is selected control goes from step S31 to step S39 where it is determined whether remote controller release button 27 has been depressed. If it has been depressed, information relating to the release operation is transmitted to the camera 13 in step S49, and then photographing is executed without using remote controller strobe 23. Whether the camera strobe 19 is used or not depends on the photographing mode selected in the camera 13 as described previously.

If the control mode (b) is selected, control goes from step S31 to step S33. In steps S88 and S85, the remote controller strobe 23 is completely charged, and then control goes to step S87 where it is determined whether remote controller release button 27 has been depressed. If the remote controller release button 27 is depressed, discharging of the remote controller strobe 23 and the photographing operation are executed synchronously with each other. Since the pre-emission of light is not executed in this mode (b), control goes from step S41 to step S47 where light emission procedure of the remote controller strobe is initiated, and the information related to the release operation is transmitted to the camera 13. Note that the actual light emission of the remote controller strobe 23 is executed synchronously with the shutter release of the camera 13.

Figure 3:
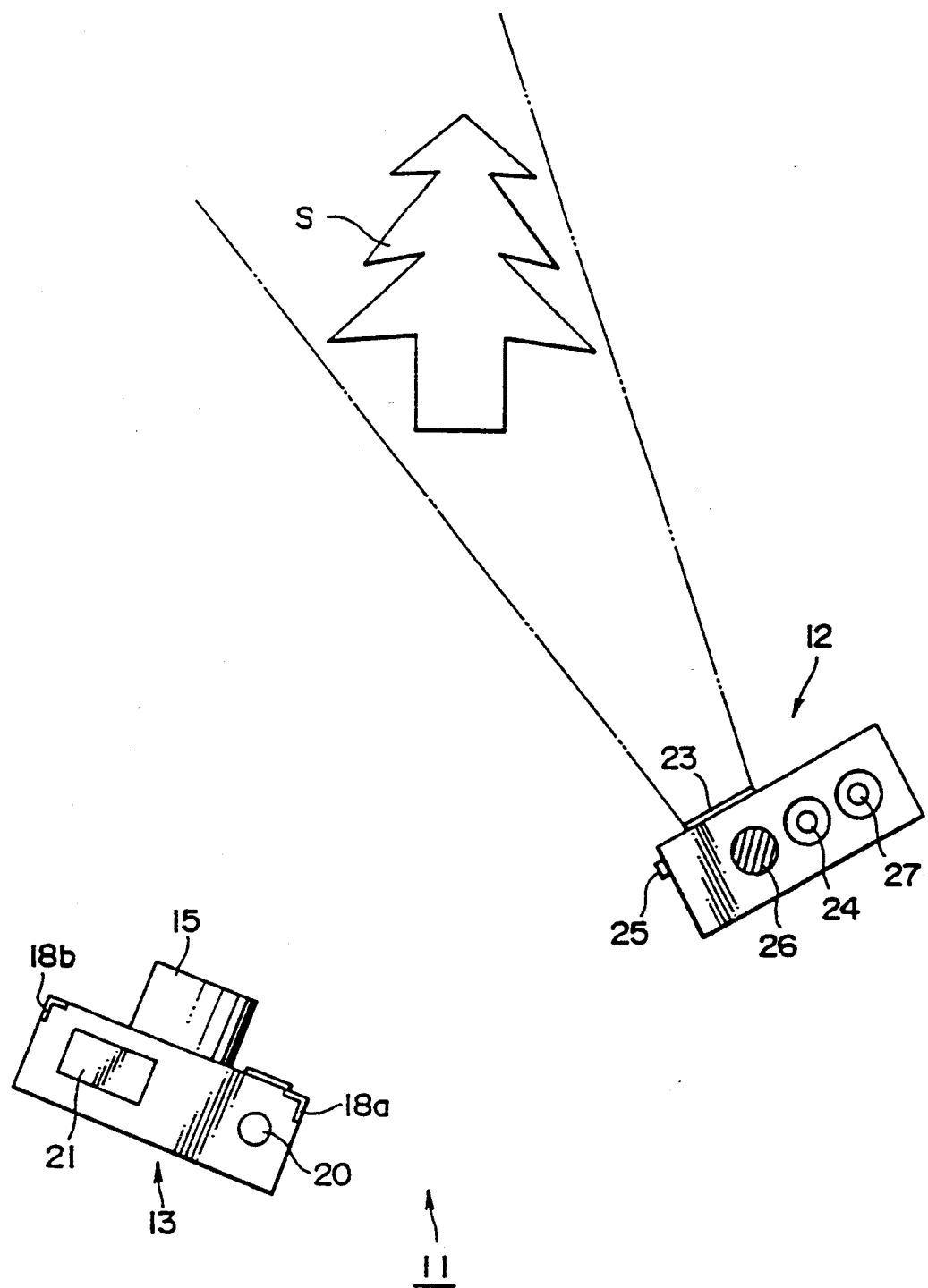
FIG. 3 shows an example of a positional arrangement of the camera and the remote controller.

FIG. 3 shows an example of a positional arrangement of the camera 13 and the remote controller 12 when photographing using only the remote controller strobe 23. As shown in FIG. 3, by locating the remote controller 12 away from the camera 13, the red-eye phenomenon can be reduced while maintaining sufficient brightness on the object. If the camera 13 is set to use the camera strobe 19, both the camera stroke 19 and the remote controller strobe 23 emit light synchronously with each other.

If the control mode (c) is selected, control goes from step S31 through step S37 similar to the case where control mode (b) is selected. In this mode (c), discharging of the strobe remote controller 23 is executed prior to the shutter release of the camera 13. Thus, in step S43, only the remote controller strobe 23 is discharged, and after a predetermined delay period has passed (in step S45), the information related to the release operation is transmitted to the camera 13. The camera control unit 29 executes the photographing operation in response to the reception of the information in using the camera strobe 19. Accordingly, in this mode, firstly the camera strobe 23 emits light, and after a predetermined delay period has passed (and while the pupils of the object people are constricted), the photographing operation is executed with the synchronous discharging (i.e., light emission) of the camera strobe 19.

As described above, since the initial discharge of the remote controller strobe 23 causes the pupils of the eyes to constrict, while the discharge of the later camera strobe 19 is used to set the proper exposure when taking the photograph. Thus the red-eye phenomenon is reduced or eliminated.

Figure 5:
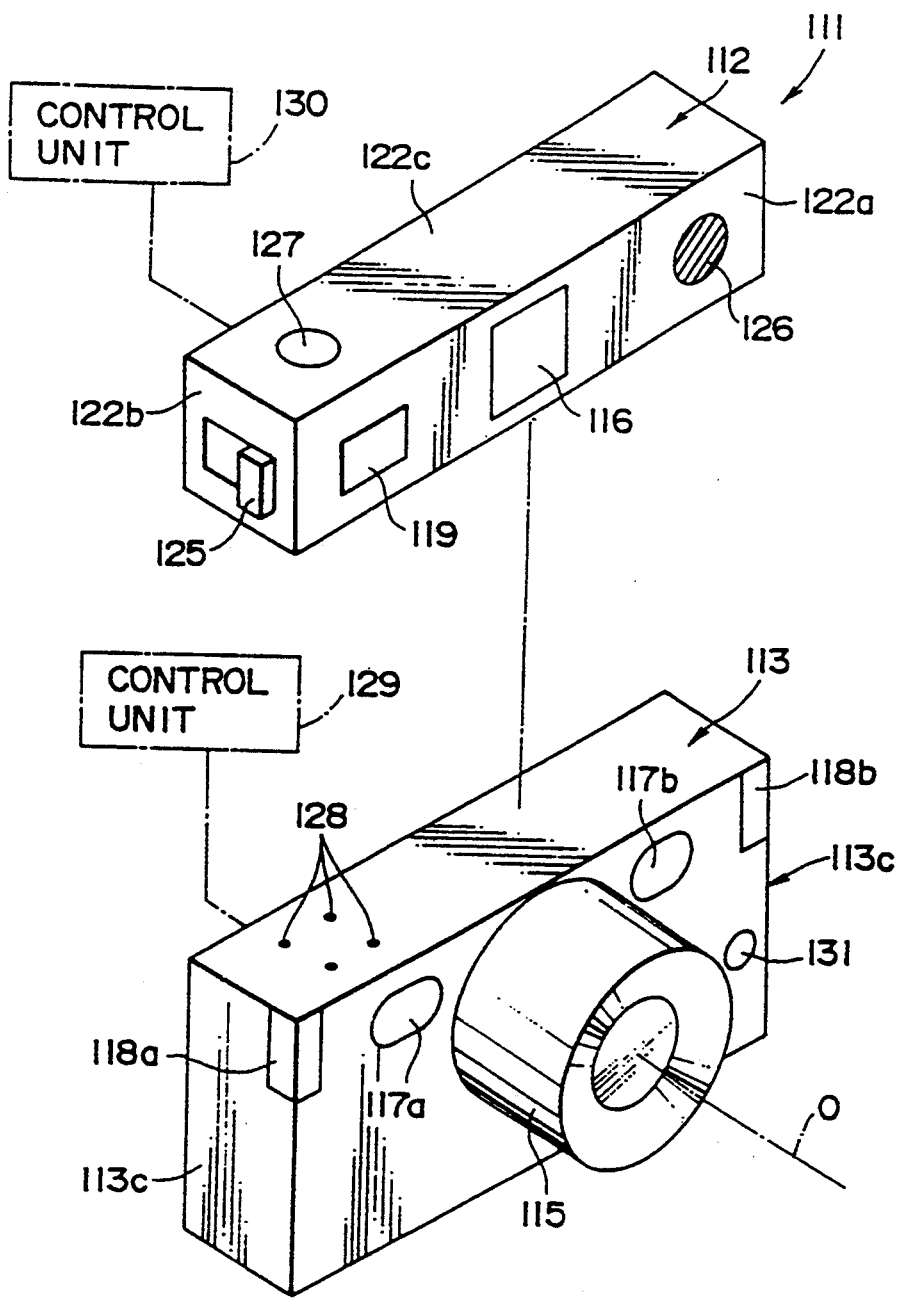
FIG. 5 is a perspective view of a camera system including a camera and a remote controller as a second embodiment of the present invention.
Figure 6:
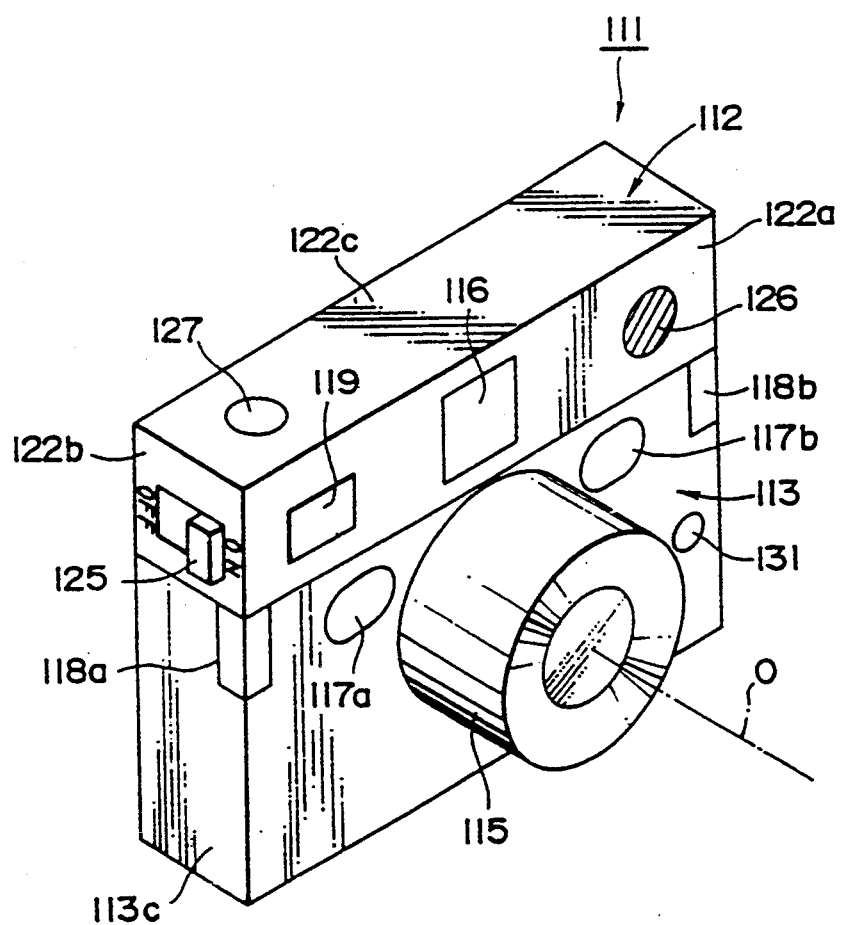
FIG. 6 is a perspective view of the camera of FIG. 5 with the remote controller attached to the camera.

FIG. 5 shows a camera system 111 as a second embodiment of the present invention. The camera system 111 includes a camera 113, and a detachable remote controller 112 for remotely controlling the operation of the camera 113. FIG. 5 shows the camera system 111 in which the remote controller 112 is detached from the camera 13. FIG. 6 shows the camera system 111 with the remote controller 112 being attached to the camera 113.

On the front surface of the camera 113, a photographing lens 115, a light emitter 131 for emitting an infrared light to be used for distance measuring are provided. The optical axis of the light emitted from the light emitter 131 is substantially parallel to the optical axis "0" of the photographing lens 115. Further, a pair of light receivers 117a and 117b are provided next to the photographing lens 115.

A pair of light receiving devices 118a and 118b for receiving a control signal (infrared light carrying a controlling information) outputted from the remote controller 112 are provided on the front surface 113a of the camera at the upper portion thereof. A control unit 129 is accommodated inside the camera 113, and terminals 128 are provided on the upper surface 113b of the camera 113. The camera control unit 129 is electrically connected with the a control unit 130 of the remote controller 112 through the a terminals 128 and the remote controller terminals (not shown) provided on the lower surface of the remote controller 112. The light receiving surfaces of the pair of light receiving devices 118a and 118b extend from the front surface 113a to the side surfaces 113c in order to receive light emitted by the remote controller 112 from various positions.

The camera control unit 129 communicates with the remote controller control unit 130 of the remote controller 112 through the terminals 128 when the remote controller 112 is attached to the camera 113 as shown in FIG. 6. In this coupled state, i.e., when the remote controller 112 is coupled to the camera 113, camera control unit 129 controls the camera system 111 as if the camera system 111 is a single unit. When the remote controller 112 is detached from the camera 113 as shown in FIG. 5, the camera control unit 129 controls the camera 113, or the camera system 111 in accordance with an information transmitted from the remote controller control unit 130 and received by the light receiving device 118a and 118b.

As shown in FIG. 5, the remote controller 112 is substantially rectangular in shape. On the lower surface of the remote controller 112, terminals (not shown) are provided to contact the camera terminals 128 that are disposed on the upper surface 113b of the camera 113. A finder 116 is provided in the central portion of the front surface 122a, a strobe 119 is provided next to the finder 116, a light emitting unit 126 for emitting infrared light carrying information relating to a release operation is provided next to the finder 116 on the opposite side of the strobe 119 with respect to the finder 116. On the side surface 122b, a strobe switch 125 for turning ON or OFF a power supply to the strobe 119 is provided. On the upper surface 122c, a release button 127 is provided. The remote controller 112 accommodates a control unit 130 therein.

Figure 8:
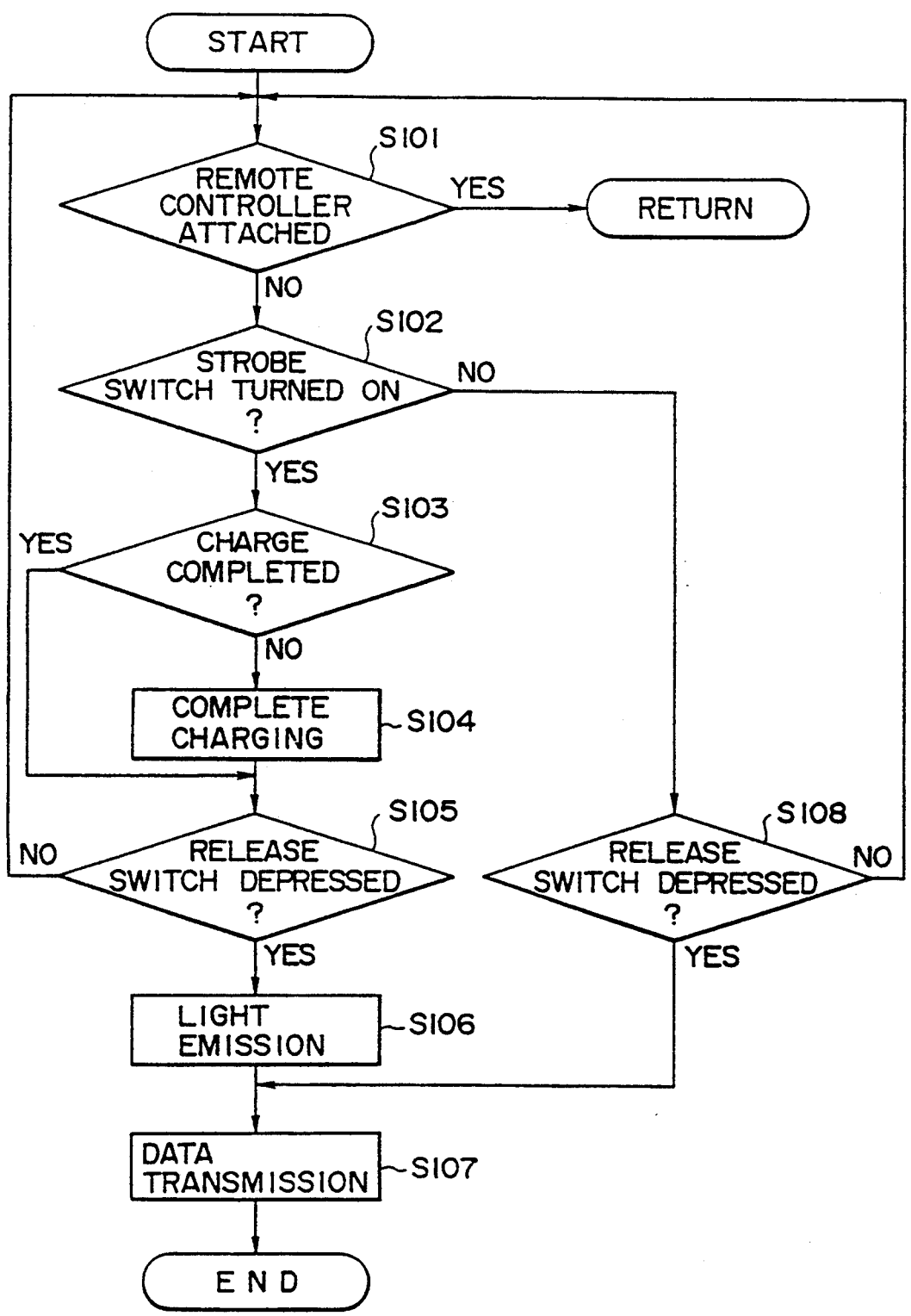
FIG. 8 is a flowchart illustrating an operation of the camera system shown in FIG. 5.

FIG. 8 is a flowchart illustrating a release operation of the camera system 113. This flowchart shows an interruption procedure which is executed when the remote controller 112 is detached from the camera 113.

When the camera system 111 is operated with the remote controller 112 being attached to the camera 113, the camera terminals 128 contact the terminals of the remote controller 112, allowing direct communication between the camera control unit 129 and the remote control unit 130. In this condition (i.e., when the remote controller 112 is attached to the camera 113), the control unit 129 controls the release operation in accordance with the information transmitted from the remote control unit 130 through camera terminals 128.

When the remote controller 112 is detached from camera system 111, photographing is executed as follows.

Figure 7:
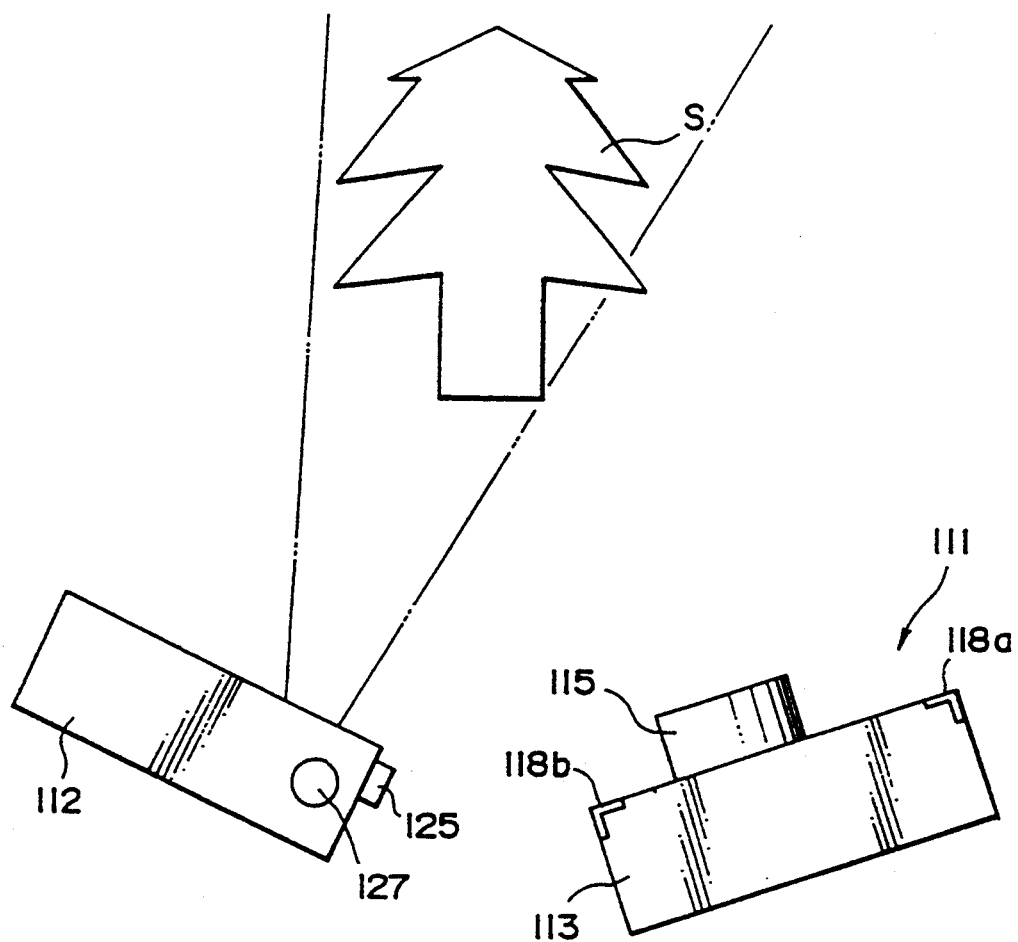
FIG. 7 shows an example of a positional arrangement of the camera and the remote controller shown in FIG. 5.

First, camera 113 is positioned to take a picture of an object S with the remote controller 112 being attached thereto. When positioning the camera 113, an operator must compose the photograph using the finder 116 of the remote controller 112. Once the photograph has been composed and the camera 113 has been positioned accordingly, the remote controller 112 is detached from the camera 113. The operator then positions the remote controller 112 away from the camera 113 as shown in FIG. 7. If the strobe switch 125 is turned ON in step S102, then photographing using strobe 119 is executed. If the strobe 119 has not been charged, then the strobe 119 is charged in step S104. After the charging of the strobe 119 is completed, if the release button 127 is depressed, the strobe 119 is discharged in step S106, and at the same time, information relating to the release operation is transmitted to the camera 113 in step S107 from the control light emitting unit 126 to the light receiving devices 118a and 118b. When the camera 113 has received the information from the remote controller 113, the camera control unit 129 executes the photographing operation such that the shutter is released with its timing thereof being adjusted with respect to the light emission of the strobe 119.

If the strobe switch is not turned On at step S102 then when the release button 127 is depressed in step S108, only shutter release information is transmitted to the camera 113 in step S107, and the strobe 119 is not discharged.

When the remote controller 112 is attached to the camera, the interrupt routine of FIG. 8 is finished and the camera operates as a single unit as described above.

As described above, according to the present invention, the remote controller strobe can be positioned at a plurality of different positions with respect to the camera body. Thus different shadowing effects can be obtained when photographing an object. Further, even if an object is far from the camera body, sufficient light can be cast on the object by locating the remote controller strobe near the object, thus the object can be photographed with sufficient brightness. Further, the optical axis of the remote controller strobe can be made different from that of the photographing lens, and thus the red-eye phenomenon can be greatly reduced or eliminated.

The present disclosure relates to subject matters contained in Japanese Utility Model Applications Nos. HEI 4-86951 and HEI 4-86952, filed on Dec. 18, 1992, which are expressly incorporated herein by reference in their entireties.

What is claimed is:

1. A camera system comprising:
    a camera body;
    a remote controller for remotely controlling said camera body to execute a photographing operation, said remote controller comprising means for wirelessly transmitting a photographing operation control signal to said camera body; and
    a strobe provided on said remote controller for being discharged to emit light towards an object being photographed when photographing is executed, said strobe being distinct from said wirelessly transmitting means, said remote controller comprising a single housing structure receiving said strobe and said wirelessly transmitting means.

2. The camera system according to claim 1, wherein said remote controller comprises:
    releasing means for initiating said photographing operation; and
    means for transmitting data relating to said photographing operation when said releasing means is operated, and wherein said camera body comprises:
    data receiving means for receiving said data transmitted by said data transmitting means; and
    controlling means for controlling said camera to execute said photographing operation a predetermined period after the reception of said data by said data receiving means.

3. The camera system according to claim 2, wherein said remote controller further comprises a transmission control means for controlling said transmitting means to vary a timing when said details transmitted to said camera body with respect to the operation of said releasing means.

4. The camera system according to claim 3, further comprising strobe controlling means for controlling said strobe to be discharged said predetermined period after the operation of said release means, and wherein said transmission control means controls said transmitting means to transmit said data upon the operation of said releasing means, whereby a discharge of said strobe and said photographing operation are executed synchronously.

5. The camera system according to claim 3, further comprising strobe controlling means for controlling said strobe to be discharged upon operation of said releasing means, and wherein said transmission control means controls said transmitting means to transmit said data a predetermined period after said releasing means has been operated so that said strobe is discharged prior to said photographing operation.

6. The camera system according to claim 2, wherein said camera body further comprises a camera strobe capable of emitting light synchronously with said photographing operation.

7. The camera system according to claim 2, wherein said remote controller can be detachably attached to said camera body.

8. The camera system according to claim 7, wherein said transmitting means and said data receiving means comprise communication members by way of which said data is transmitted only when said remote controller is attached to said camera body.

9. The camera system according to claim 8 wherein said transmitting means further comprises light emitting means for transmitting a light beam modulated by said data, and wherein said data receiving means further comprises light receiving means for receiving said light beam emitted by said light emitting means.

10. The camera system according to claim 7, wherein said remote controller further comprises a finder for viewing an object to be photographed.

11. The camera system according to claim 1, wherein said camera body comprises controlling means for controlling a photographing operation to be executed by said camera.

12. The camera system according to claim 1, wherein said camera body comprises release means for being operated to execute a photographing operation.

13. The camera system according to claim 1, wherein said camera body comprises a finder.

14. The camera system according to claim 1, wherein said camera body comprises another strobe means capable of being used in photographing.

15. The camera system according to claim 1, wherein said remote controller is attachable to said camera body at a predetermined position thereof, wherein said remote controller comprises means for viewing an object, and wherein said viewing means functions as a finder when said remote controller is attached to said camera.

16. A remote controller for a camera, comprising:
releasing means for initiating a photographing operation of the camera;
transmitting means for wirelessly transmitting data related to a release operation of said releasing means to the camera to execute said photographing operation of the camera;
a strobe device for emitting light towards an object to be photographed, said strobe device being distinct from said transmitting means, said strobe device and said transmitting means received within a single remote controller housing structure; and
controlling means for controlling said strobe device to be discharged when said releasing means is operated.

17. The remote controller according to claim 16, wherein said transmitting means transmits said data at a predetermined timing with respect to the operation of said releasing means.

18. The remote controller according to claim 17, wherein said transmitting means transmits said data after said strobe is discharged so that said photographing operation is executed a predetermined period after said strobe is discharged.

19. The remote controller according to claim 16, wherein said transmitting means is capable of varying a timing when said data is transmitted to said camera with respect to the operation of said releasing means.

20. A camera system comprising:
a camera body; and
a remote controller for remotely controlling said camera body to execute a photographing operation, said remote controller comprising,
releasing means for initiating said photographing operation;
means for wirelessly transmitting data related to said photographing operation to said camera body when said releasing means is operated;
said camera body comprising data receiving means for receiving said data transmitted by said data transmitting means,
said data receiving means comprising a photo-detector device extending from a first wall surface to a second wall surface of said camera body, said first and second wall surfaces of said camera body extending in planes transverse to each other.

21. A camera system comprising:
a camera body comprising a first strobe;
a remote controller for wirelessly controlling said camera body to execute a photographing operation, said remote controller comprising a second strobe and release means for initiating a photographing operation of the camera; and
control means for controlling said first strobe and said second strobe to be selectively discharged when said releasing means is operated.

22. A camera system comprising:
a camera body; and
a remote controller for wirelessly controlling said camera body to execute a photographing operation, said remote controller being selectively attachable and detachable from the camera body,
said remote controller comprising a viewfinder for viewing an object to be photographed when attached to said camera body,
said remote controller wirelessly transmitting signals to the camera body when detached from the camera body.

23. The camera system according to claim 1, further comprising control means provided on said remote controller for actuating said wireless transmitting means and selectively actuating said strobe signal generating means during a single photographing operation.

24. The remote controller for a camera according to claim 16, said control means actuating said wireless transmitting means and selectively actuating said strobe means during a single photographing operation.

* * * * *

UNITED STATES PATENT AND TRADEMARK OFFICE
CERTIFICATE OF CORRECTION

PATENT NO. : 5,446,512
DATED : August 29, 1995
INVENTOR(S) : Makoto MOGAMIYA

It is certified that error appears in the above-indentified patent and that said Letters Patent is hereby corrected as shown below:

At column 8, line 52 (claim 3, line 2), delete "a".
At column 8, line 54 (claim 3, line 4), change "details" to ---data is---.
At column 10, lines 25 and 26 (claim 20, lines 14 and 15), change "photo-detector" should be changed to ---photodetector---.

Signed and Sealed this

Twentieth Day of February, 1996

Attest:

BRUCE LEHMAN

Attesting Officer

Commissioner of Patents and Trademarks